(12) United States Patent
Oh et al.

(10) Patent No.: US 9,519,420 B2
(45) Date of Patent: Dec. 13, 2016

(54) APPARATUS AND METHOD FOR EDITING SYNCHRONOUS MEDIA

(71) Applicant: Samsung Electronics Co., Ltd., Suwon-si, Gyeonggi-do (KR)

(72) Inventors: Baeksan Oh, Bridgewater, NJ (US); Izzat Bahadirov, Kendall Park, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 14/186,518

(22) Filed: Feb. 21, 2014

(65) Prior Publication Data

US 2015/0106712 A1    Apr. 16, 2015

Related U.S. Application Data

(60) Provisional application No. 61/891,536, filed on Oct. 16, 2013.

(51) Int. Cl.
| | |
|---|---|
| *G06F 3/048* | (2013.01) |
| *G06F 3/0488* | (2013.01) |
| *G11B 27/034* | (2006.01) |
| *G11B 27/34* | (2006.01) |
| *G06F 3/0484* | (2013.01) |
| *G06F 3/0482* | (2013.01) |

(52) U.S. Cl.
CPC ............ *G06F 3/0488* (2013.01); *G06F 3/0482* (2013.01); *G06F 3/04842* (2013.01); *G11B 27/034* (2013.01); *G11B 27/34* (2013.01)

(58) Field of Classification Search
CPC ................. G06F 3/017; G06F 3/048–3/04883; G06F 17/211–17/3089
See application file for complete search history.

(56) References Cited

U.S. PATENT DOCUMENTS

| | | |
|---|---|---|
| 5,781,188 A | 7/1998 | Amiot et al. |
| 8,130,208 B2 | 3/2012 | Arimoto |
| 8,774,604 B2 | 7/2014 | Torii et al. |
| 2008/0044155 A1 | 2/2008 | Kuspa |
| 2008/0165141 A1 | 7/2008 | Christie |
| 2009/0087161 A1 | 4/2009 | Roberts et al. |
| 2010/0056128 A1 | 3/2010 | Hwang et al. |
| 2011/0305438 A1* | 12/2011 | Torii ................... G11B 27/034 386/279 |
| 2012/0124677 A1* | 5/2012 | Hoogerwerf .......... G06F 3/0481 726/29 |
| 2012/0263439 A1 | 10/2012 | Lassman et al. |

(Continued)

FOREIGN PATENT DOCUMENTS

| | | |
|---|---|---|
| EP | 2 209 311 A1 | 7/2010 |
| EP | 2 398 021 A2 | 12/2011 |

(Continued)

*Primary Examiner* — Claudia Dragoescu
(74) *Attorney, Agent, or Firm* — Jefferson IP Law, LLP (57) ABSTRACT

An apparatus and method for editing synchronous media files are provided. The method includes receiving a plurality of synchronous media files, displaying a plurality of synchronous media streams corresponding to the synchronous media files on a screen, detecting a touch input for selecting a portion of one of the plurality of synchronous streams, and adding the selected portion of the one of the plurality of synchronous media streams to an edited media stream.

29 Claims, 5 Drawing Sheets (56) References Cited

U.S. PATENT DOCUMENTS

| | | |
|---|---|---|
| 2013/0055087 A1 | 2/2013 | Flint |
| 2013/0121668 A1 | 5/2013 | Meaney et al. |
| 2013/0124999 A1 | 5/2013 | Agnoli et al. |
| 2013/0257770 A1 | 10/2013 | Tsaregorodtsev |
| 2015/0082217 A1* | 3/2015 | Tumwattana ......... G06F 3/0485 715/769 |

FOREIGN PATENT DOCUMENTS

| | | |
|---|---|---|
| EP | 2 610 760 A2 | 7/2013 |
| JP | 2008-310543 A | 12/2008 |
| JP | 2010-541415 A | 12/2010 |
| JP | 2012-004739 A | 1/2012 |
| JP | 2012-175281 A | 9/2012 |
| JP | 2012-230526 A | 11/2012 |
| KR | 10-2008-0089722 A | 10/2008 |
| WO | 2008/022292 A2 | 2/2008 |
| WO | 2013/074207 A1 | 5/2013 |

\* cited by examiner

APPARATUS AND METHOD FOR EDITING SYNCHRONOUS MEDIA

CROSS-REFERENCE TO RELATED APPLICATION(S)

This application claims the benefit under 35 U.S.C. §119(e) of a U.S. Provisional application filed on Oct. 16, 2013 in the U.S. Patent and Trademark Office and assigned Ser. No. 61/891,536, the entire disclosure of which is hereby incorporated by reference.

TECHNICAL FIELD

The present disclosure relates to an apparatus and method for editing synchronous media. More particularly, the present disclosure relates to an apparatus and method for editing video from a plurality of synchronous video sources.

BACKGROUND

Portable terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

According to the related art, portable terminals may be equipped with a touchscreen. In addition to providing a display functionality such as displaying a User Interface (UI), the touchscreen allows a user to provide input to the portable terminal. For example, the UI may display at least one item with which a user may interact. The item may be a media file such as a video file, a music file, and/or the like.

According to the related art, portable terminals may be used to edit files. For example, a portable terminal may be used to edit a media file. However, portable terminals suffer from several deficiencies that render the use of a portable terminal to edit a file cumbersome and thus inconvenient to a user. A non-exhaustive list of the deficiencies of portable terminals according to the related art include limited processing power, lack of intuitive methods for inputting commands to the portable terminal, and/or the like.

According to the related art, applications provided for portable terminals provide very limited functions for editing files. For example, applications provided for portable terminals allow for only very basic image/video editing functions such as, for example, a brightness/contrast adjustment function, a zoom function, a seek-to-position function, and a volume adjustment function.

Accordingly, there is a need for an apparatus and method for providing an improved editing of media in a portable terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for editing synchronous media.

In accordance with an aspect of the present disclosure, a method for editing synchronous media files is provided. The method includes receiving a plurality of synchronous media files, displaying a plurality of synchronous media streams corresponding to the synchronous media files on a screen, detecting a touch input for selecting a portion of one of the plurality of synchronous streams, and adding the selected portion of the one of the plurality of synchronous media streams to an edited media stream.

In accordance with another aspect of the present disclosure, an apparatus for editing synchronous media files is provided. The apparatus includes a communication unit configured to receive a plurality of synchronous media files, a touchscreen configured to display a plurality of synchronous media streams corresponding to the synchronous media files, and a controller configured to operatively receive a plurality of synchronous media files through the communication unit, to operatively display a plurality of synchronous media streams corresponding to the synchronous media files on the touchscreen, to operatively detect a touch input for selecting a portion of one of the plurality of synchronous streams, and to operatively add the selected portion of the one of the plurality of synchronous media streams to an edited media stream.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk ("DVD") player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography ("CT") device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method for editing synchronous media.

According to various embodiments of the present disclosure, a portable terminal may be used to edit synchronous media. As an example, the portable terminal may be an electronic device.

According to various embodiments of the present disclosure, the portable terminal may edit the various synchronous media files. For example, the portable terminal may edit the synchronous media files for a same event so as to generate an edited media file (e.g., that relates to the same event).

According to various embodiments of the present disclosure, the portable terminal may receive a pointer (e.g., an address) to a location at which a media file is stored (e.g., a server address). For example, the portable terminal may receive an address at which the at least one other terminal has stored the media file.

According to various embodiments of the present disclosure, a portable terminal may communicate with at least one other terminal and receive a media file. According to various embodiments of the present disclosure, the portable terminal may receive a media file from the at least one other terminal for a same event. For example, the portable terminal may receive synchronous media files from a plurality of other terminals for a same event. As an example, an event may be a personal event (e.g., a party), a concert, a sporting event, and/or the like.

According to various embodiments of the present disclosure, an apparatus and method for providing an interface for editing synchronous media may be provided. According to various embodiments of the present disclosure, an interface and method may provide continuous interaction on a touchscreen to edit, combine, splice, and/or the like video frames that were taken synchronously to improve video editing and/or merging of multiple video (media) streams. In contrast, according to the related art, a user must expressly trim video streams into desired videos and thereafter combine the trimmed videos to form a finished video. According to the related art, the method for video editing synchronous streams required multiple interactions.

According to various embodiments of the present disclosure, a user may select synchronized frames, clips, or the like of multiple media streams in a continuous manner. According to various embodiments of the present disclosure, a user may select a frame, clip, or the like by touching the touchscreen (e.g., on an area corresponding to the selected frame, clip, or the like). According to the various embodiments of the present disclosure, a timeline of the synchronous media files and for selection of constituent frames, clips, or the like of the edited media file may be advanced. For example, the timeline may start scrolling automatically when the portable is in a mode for editing the synchronous media files. As another example, the timeline may advance as the user is selecting constituent frames, clips, or the like of the edited media file. According to various embodiments of the present disclosure, the timeline may advance based on a detected movement of a touch gesture. For example, the timeline may advance forward to later time durations if the user moves a gesture from the left to right. As another example, the timeline may advance to a previous time duration if the user moves a gesture from right to left. According to various embodiments of the present disclosure, the speed at which the timeline advance may be based on a speed of a gesture. For example, if the gesture corresponds to a fast gesture, then the timeline may advance at a relatively faster speed. In contrast, if the gesture corresponds to a slow gesture, then the timeline may advance at a relatively slower speed. According to various embodiments of the present disclosure, timeline may advance at a preset speed. The preset speed may be configurable (e.g., by a user, by a manufacturer, and/or the like).

As the timeline advances, the user may continue to select a frame, clip, or the like by touching the touchscreen. A time duration according to which the timeline advances may be configurable (e.g., by a user, by a manufacturer, and/or the like). The time duration may be a length of a time for which each frame, clip, or the like is representative in relation to the respective synchronous media file.

According to various embodiments of the present disclosure, as the user continues to select a frame, clip, or the like, the selected frame, clip, or the like is added to the edited media file (e.g., a composite file comprising segments from a plurality of synchronous media files according to user selection).

According to various embodiments of the present disclosure, a user may skip a frame, clip, or the like when editing the synchronous media files to generate the edited media file. The user may skip the frame, clip, or the like by moving the touch input to an area between the constituent frames, clips, or the like being of the synchronous media files being displayed. For example, the user may skip the frame, clip, or the like by moving the touch input across an area within the interstices between the constituent frames, clips, or the like so as not to touch a frame, clip, or the like.

According to various embodiments of the present disclosure, scrolling of the frames, clips, or the like may be stopped by terminating the touch input (e.g., by lifting the user's touch). For example, the advancement of the timeline of the synchronous media files and for selection of constituent frames, clips, or the like of the edited media file may be stopped by terminating the touch input. According to various embodiments of the present disclosure, advancement of the timeline of the synchronous media files may be continued by inputting a touch input to select another frame, clip, or the like to be added to the edited media file.

According to various embodiments of the present disclosure, the synchronous media files may be displayed in an array. For example, each media file may be displayed by dividing the media file according to frames, clips, or the like. For example, the media file (or a portion thereof) may be displayed on the screen so as to include a plurality of clips each corresponding to a threshold time period (e.g., 0.5 seconds). As another example, the media file (or a portion thereof) may be displayed on the screen so as to include a plurality of frames. According to various embodiments of the present disclosure, a plurality of the synchronous media files may be displayed in the array. For example, along one dimension of the array, constituent frames, clips, or the like may be displayed along one direction (e.g., along one axis of the array), and constituent synchronous media files may be displayed along another dimension of the array (e.g., along another axis of the array). According to various embodiments of the present disclosure, the array may be arranged so that each constituent frame, clip, or the like of one of the synchronous media files is aligned with a corresponding constituent frame, clip, or the like of at least one other synchronous media files. According to various embodiments of the present disclosure, the array may be arranged so that each displayed constituent frame, clip, or the like of one of the synchronous media files is aligned with a corresponding constituent frame, clip, or the like of at least one other synchronous media files. According to various embodiments of the present disclosure, each cell of the array may comprise a frame, clip, or the like corresponding to a respective synchronous media stream for a respective time duration.

According to various embodiments of the present disclosure, synchronous media files (e.g., synchronous media streams) are displayed in time-aligned relation. According to various embodiments of the present disclosure, the synchronous media files are displayed such that constituent frames, clips, or the like are time-aligned. According to various embodiments of the present disclosure, a user may form an edited media file by selecting constituent frames, clips, or the like for each time duration of the edited media file. Selection of the constituent frames, clips, or the like may be made from among frames, clips, or the like of the synchronous media files (or subset thereof).

According to various embodiments of the present disclosure, synchronous media files (e.g., synchronous media streams) are displayed in time-aligned relation. A user may select a constituent frame, clip, or the like for the edited media file by touching a touchscreen at a location corresponding to the desired frame, clip, or the like.

According to various embodiments of the present disclosure, the portable terminal may edit the various synchronous media files according to user input to the portable terminal. According to various embodiments of the present disclosure, the portable terminal may edit the various synchronous media files according to an input to a touchscreen of the portable terminal. At least one preset input for file editing may be stored in the portable terminal. Upon detection of a user input, the portable terminal may determine whether the user input corresponds to one of the preset inputs for file editing. If the portable terminal determines that the user input corresponds to one of preset inputs for file editing, then the portable terminal may edit the file according to the user input. For example, the portable terminal may edit at least one of the synchronous media files. As another example, the portable terminal may edit or otherwise generate an edited media file according to the detected user input.

According to various embodiments of the present disclosure, the at least one preset input for file editing may correspond to an input for performing a special effect.

According to various embodiments of the present disclosure, a glide through a sequence of frames or clips multiple times may correspond to a function for creating a repetition effect. The repetition effect may edit the edited media file so as to repeat the sequence of frames or clips through which the user input was glided.

According to various embodiments of the present disclosure, a horizontal pinch-to-zoom gesture may correspond to a function for changing a time duration of clips on the timeline. For example, if the horizontal pinch-to-zoom gesture is a pinch of the user's fingers, then the corresponding function may be to decrease the time duration of the clips on the timeline. As another example, if the horizontal pinch-to-zoom gesture is a moving apart of the user's fingers, then the corresponding function may be to increase the time duration of the clips on the timeline. The horizontal pin-to-zoom gesture may be used to control the duration of a clip that is added to the edited media file. For example, if time duration of the clips on the timeline is 5 seconds, and a horizontal pinch-to-zoom gesture in which a pinch of the user's fingers is input, then the time duration of the clips on the timeline may be decreased to 3 seconds such that any clips selected to be added to the edited media file under such a configuration will have a duration of 3 seconds.

According to various embodiments of the present disclosure, a vertical pinch-to-zoom gesture may correspond to a function for controlling a display size of frame, clips, or the like. For example, if the vertical pinch-to-zoom gesture is a pinch of the user's fingers, then the corresponding function may be to decrease the display size of the frame, clips, or the like. As another example, if the vertical pinch-to-zoom gesture is a moving apart of the user's fingers, then the corresponding function may be to increase the display size of the frame, clips, or the like.

According to various embodiments of the present disclosure, a diagonal pinch-to-zoom gesture may correspond to a function for controlling a playback speed of a corresponding clip in the final video (e.g., the edited media file). The diagonal pinch-to-zoom gesture may correspond to a function for inserting slow/fast motion effects to the edited media file. For example, a diagonal pinch-to-zoom gesture may be applicable to a selected clip of the edited media file so as to control the playback speed of the selected clip. As another example, a diagonal pinch-to-zoom gesture may be applicable to all clips of the edited media file so as to control the playback speed of the all clips of the edited media file. As an example, if the diagonal pinch-to-zoom gesture is a pinch of the user's fingers, then the corresponding function may be to decrease the playback speed of the corresponding clip(s) in the edited media file. As another example, if the diagonal pinch-to-zoom gesture is a moving apart of the user's fingers, then the corresponding function may be to increase the playback speed of the corresponding clip(s) in the edited media file.

According to various embodiments of the present disclosure, a two-finger drag gesture may correspond to a function for scrolling through a timeline of media clips. For example, a two-finger horizontal drag gesture may correspond to a function for scrolling through a timeline of media clips. As an example, a two-finger horizontal drag gesture may advance through frames or clips of a corresponding media file. As another example, a two-finger horizontal drag gesture may advance through all frames or clips of the synchronous media files corresponding to the same event (e.g., such that in a displayed array of the synchronous media files, the frames or clips of each corresponding media file matches the frames or clips of the other media file(s) in relation to the timeline). A two finger horizontal drag gesture from right to left may correspond to a function for scrolling through a timeline of media clips so as to advance the media file in relation to time (e.g., to show media clips relating to a later time). A two finger horizontal drag gesture from left to right may correspond to a function for scrolling through a timeline of media clips so as to move forward the media file in relation to time (e.g., to show media clips relating to an earlier time).

According to various embodiments of the present disclosure, a two-finger drag gesture may correspond to a function for scrolling through media streams (e.g., video streams). For example, a two-finger drag gesture may correspond to a function for scrolling through the various media streams corresponding to the synchronous media files.

According to various embodiments of the present disclosure, the array in which elements of the synchronous media files is arranged may comprise spacing therebetween. According to various embodiments of the present disclosure, in the areas of spacing between the elements of the synchronous media files, a user input may be a null input such that the portable terminal does not register the input as a command for editing the media files. For example, the spaces between the elements may be used as part of a finger glide as part of the user input for selecting a specific frame, clip, or the like. For example, a user may select frames, clips, or the like among the various frames, clips, or the like of the synchronous media files. The selected frames, clips, or the like may constitute edited media file. For example, a user may navigate through frames, clips, or the like of an event according to time. As the user navigates through frames, clips, or the like of the event, the user may select a frame, clip, or the like for any time duration of the event. The selected frame, clip, or the like may be selected from among the frames, clips, or the like of the synchronous media files for that specific time duration.

According to various embodiments of the present disclosure, a previously selected frame, clip, or the like that is selected to be part of the edited media file may be unselected by performing a reverse glide thereover. As an example, if a user input for selecting a frame, clip, or the like corresponds to a glide gesture from right to left over the frame, clip, or the like to be selected, then a reverse glide for unselecting a frame, clip, or the like, may correspond to a glide gesture from left to right over the frame, clip, or the like to be unselected.

According to various embodiments of the present disclosure, the edited media file may be a video file, a music file, a slideshow (e.g., a business presentation, or the like), or the like. For example, the synchronous media may be a video, a music file, a slideshow, or the like. According to various embodiments of the present disclosure, if the edited media file is a slideshow, a composite slideshow may be generated from among a plurality of files comprising slides for a slideshow.

Figure 1:
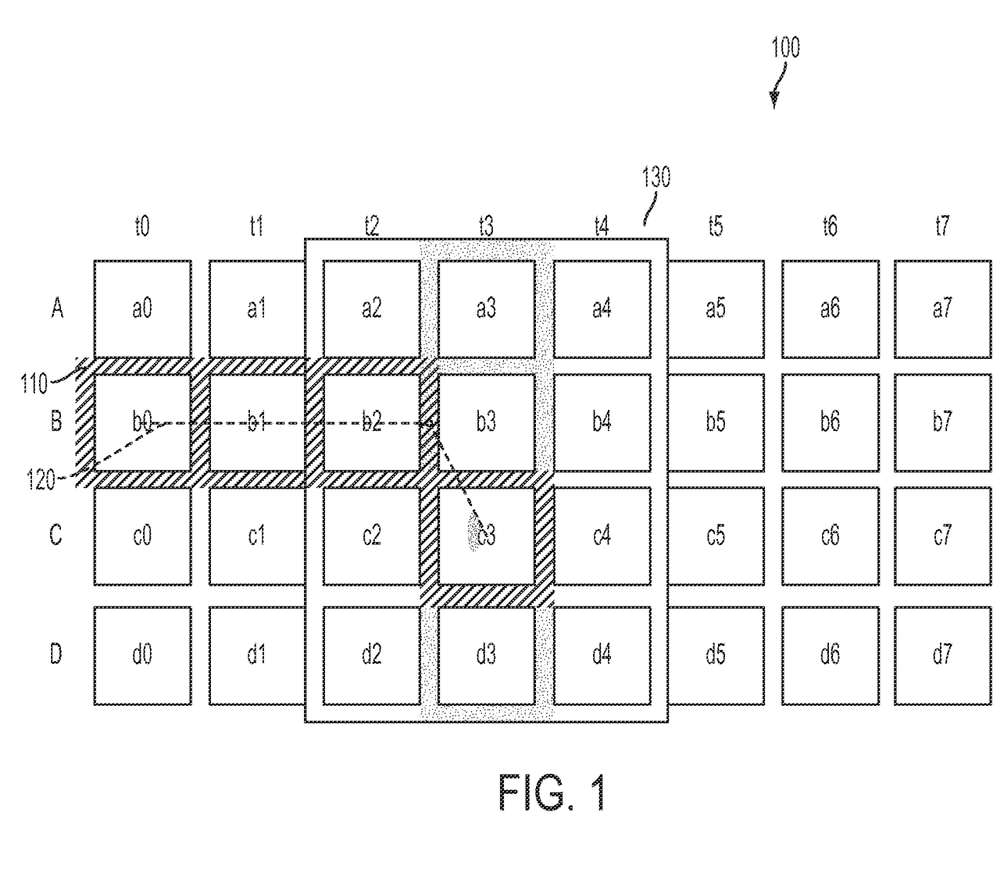
FIG. 1 is an illustration of a selection of media according to time interval and media source according to various embodiments of the present disclosure.

FIG. 1 is an illustration of a selection of media according to time interval and media source according to various embodiments of the present disclosure.

Referring to FIG. 1, a user interface 100 is displayed. For example, the portable terminal may display the user interface 100 when an application for editing synchronous media is executed. The user interface 100 may be configured to display a plurality of synchronous media received by or otherwise stored on the portable terminal. For example, as illustrated in FIG. 1, the user interface displays four synchronous media streams—media stream A, media stream B, media stream C, and media stream D. Each of the synchronous media streams are displayed according to time durations. The time durations are represented by t0, t1, t2, t3, t4, t5, t6, and t7.

According to various embodiments of the present disclosure, the user interface 100 may display the synchronous media files so as to be arranged in an array with corresponding frames, clips, or the like being arranged according to time duration. For example, as illustrated in FIG. 1, the user interface 100 displays the synchronous media streams along a vertical axis, and the time (e.g., divided into time durations) along the horizontal axis. As an example, for media stream A, the stream is divided into frames, clips, or the like according to time duration and mapped accordingly. For example, a0 corresponds to the frame, clip, or the like of media stream A during time duration t0; a1 corresponds to the frame, clip, or the like of media stream A during time duration t1; a2 corresponds to the frame, clip, or the like of media stream A during time duration t2; a3 corresponds to the frame, clip, or the like of media stream A during time duration t3; a4 corresponds to the frame, clip, or the like of media stream A during time duration t4; a5 corresponds to the frame, clip, or the like of media stream A during time duration t5; a6 corresponds to the frame, clip, or the like of media stream A during time duration t6; and a7 corresponds to the frame, clip, or the like of media stream A during time duration t7. Similarly, media stream B is arranged so as to have frames, clips or the like b0, b1, b2, b3, b4, b5, b6, and b7 respectively arranged with corresponding time durations t0, t1, t2, t3, t4, t5, t6, and t7; media stream C is arranged so as to have frames, clips or the like c0, c1, c2, c3, c4, c5, c6, and c7 respectively arranged with corresponding time durations t0, t1, t2, t3, t4, t5, t6, and t7; and media stream D is arranged so as to have frames, clips or the like d0, d1, d2, d3, d4, d5, d6, and d7 respectively arranged with corresponding time durations t0, t1, t2, t3, t4, t5, t6, and t7.

According to various embodiments of the present disclosure, a user may edit the synchronous media files so as to generate an edited media file (e.g., a composite media file. The user may select frames, clips, or the like to add to the edited media file. For example, the user may select the desired frames, clips, or the like by interacting with the user interface 100. The user interface 100 may be implemented in conjunction with a touchscreen. According to various embodiments of the present disclosure, the user may select the desired frames, clips, or the like by touching the touchscreen at the location at which the desired frames, clips, or the like are displayed.

According to various embodiments of the present disclosure, the user interface 100 may display the frames, clips, or the like of the synchronous media files for a subset of the time durations. For example, as illustrated in FIG. 1, the user interface 100 may display the corresponding frames, clips, or the like of the synchronous media files for a subset of the time durations within a selection window 130. The selection window 130 spans three time durations t2, t3, and t4. The user may select, unselect, or otherwise interact with the subset of frames, clips, or the like displayed within the selection window.

According to various embodiments of the present disclosure, the user may edit the synchronous media files to generate the edited media file by selecting entering a touch input on a desired frame, clip, or the like. For example, if the user enters a touch input 110 at b0 corresponding to the frame, clip, or the like of media stream B at time duration t0 (e.g., when b0 is within the selection window 130), then the b0 may be selected to be added to the edited media file.

According to various embodiments of the present disclosure, when the user selects a frame, clip, or the like, then the timeline may start scrolling (e.g., advancing in time). For example, as the timeline scrolls, the selection window 130 may advance to display frames, clips, or the like at later time durations in order to allow the user to sequentially select frames, clips, or the like to be added to the edited media file.

Figure 2:
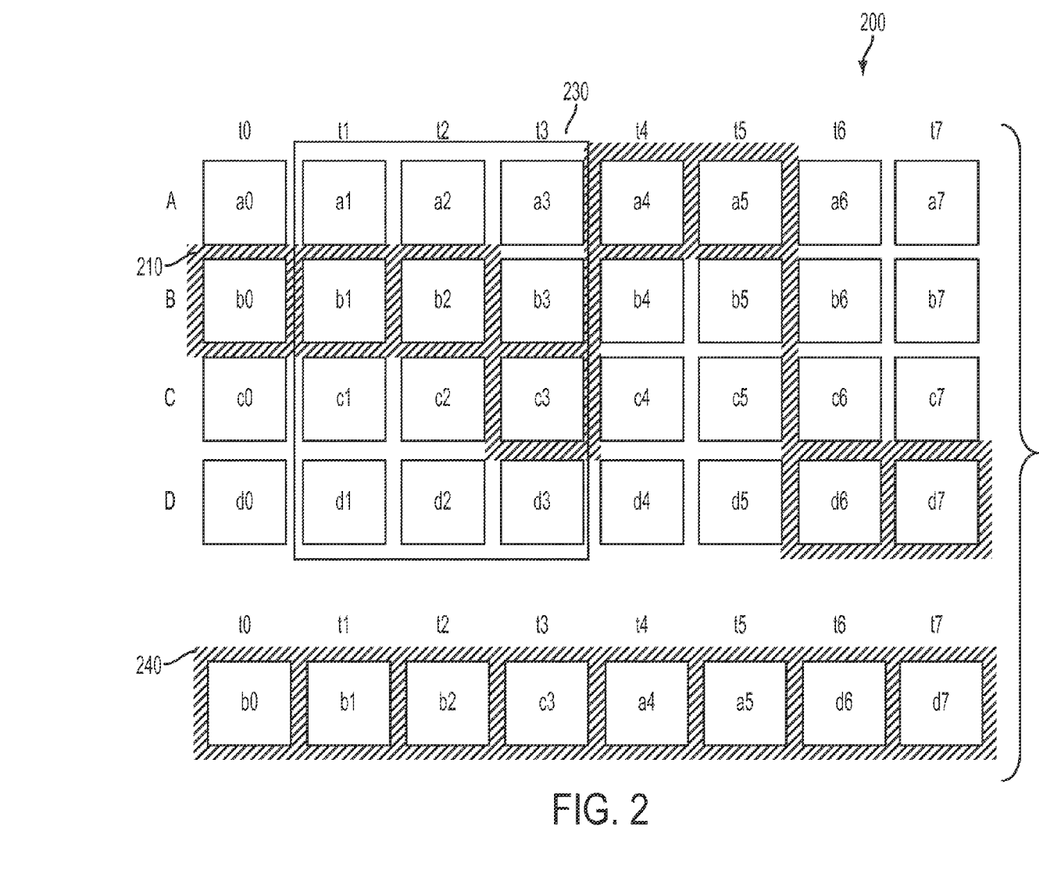
FIG. 2 is an illustration of an edited media according to time interval and media source according to various embodiments of the present disclosure.

After entering a touch event as a touch input (e.g., at b0), the user may continue to select additional frames, clips, or the like by dragging the touch input over the desired frames, clips, or the like. For example, as illustrated in FIG. 2, the user may input a selection vector 120 that selects b0, b1, b2, and c3. According to various embodiments of the present disclosure, the user may direct the touch input to the desired frame, clip, or the like for any of the displayed media streams. According to various embodiments of the present disclosure, the user may direct the touch input to the desired frame, clip, or the like for any of the displayed media streams at any of the displayed time durations. For example, as illustrated in FIG. 2, after selecting b2 corresponding to a frame, clip, or the like of media stream B along the selection vector 120, the user directed the selection vector 120 to c3 corresponding to a frame, clip, or the like of media stream C.

According to various embodiments of the present disclosure, the user interface 100 may display the current time duration, for which selection is being made, emphatically in relation to other displayed time durations. For example, as illustrated in FIG. 1, the selection window 130 includes frames, clips, or the like for media streams A, B, C, and D at time durations t2, t3, and t4. The current selection corresponds to selection of c3 at which the touch input has been dragged along the selection vector 120. According to various embodiments of the present disclosure, a3, b3, c3, and d3 may be displayed emphatically in relation to a2, b2, c2, d2, a4, b4, c4, and d4. For example, the interstices adjacent to a3, b3, c3, and d3 may be shaded relative to other spaces between frames, clips, or the like displayed in the selection window 130.

According to various embodiments of the present disclosure, the user may navigate the touch input through the interstices between frames, clips, or the like to avoid selecting undesired frames, clips, or the like. For example, if the touch input is currently at c3 and the user desires to select a4 to correspond to the frames, clip or the like at time duration t4 of the edited media file, then the user may drag the touch input through the interstices between the frames, clips, or the like displayed in relation to time duration t3 and the frames, clips, or the like displayed in relation to time duration t4. To select a4, the user may drag the touch input over the touchscreen at the location at which a4 is displayed.

According to various embodiments of the present disclosure, the user may unselect previously selected frames, clips, of the like that are added to the edited media file. According to various embodiments of the present disclosure, the user may unselect the previously selected frames, clips, of the like by dragging the touch input so as to navigate the touch input back along the selection vector 120. For example, if the touch input is currently located at frame c3 and the user wishes to deselect c3 and b2, then the user may drag the touch input back to b2, which would unselect c3, and thereafter, the user may drag the touch input back to b1 so as to unselect b2. According to various embodiments of the present disclosure, if the user deselects frames, clips, or the like, or otherwise drags the touch input backwards in time (e.g., to previous time durations), then the timeline may scroll in a reverse direction. For example, the selection window 130 may be shifted back so as to display frames, clips, of the like at time durations corresponding to the location of the touch input in relation to the synchronous media files (e.g., corresponding to the location and/or progress of the selection vector 120).

According to various embodiments of the present disclosure, the selected frames, clips, or the like (e.g., the frames, clips, or the like along the selection vector 120) may be displayed emphatically in relation to frames, clips, or the like that are not selected. For example, the areas in or around the selected frames, clips, or the like may be shaded (e.g., shaded differently than areas in or around the frames, clips, or the like that are not selected).

FIG. 2 is an illustration of an edited media according to time interval and media source according to various embodiments of the present disclosure.

Referring to FIG. 2, an edited media file may be generated according to user selection of the frames, clips, or the like from among the synchronous media files. As illustrated in FIG. 2, user interface 210 may display an arrangement of frames, clips, or the like of the synchronous media files (e.g., corresponding to media stream A, media stream B, media stream C, and media stream D). As illustrated in FIG. 2, the selection 210 of the frames, clips, or the like selected b0, b1, b3, c3, a4, a5, d6, and d7. For example, the selection 210 may have been input via a touch input event at b0, and a dragging of the touch input across b1, b2, c3, a4, a5, d6, and d7.

According to various embodiments of the present disclosure, the selected frames, clips, or the like that may be displayed under the arrangement of frames, clips, or the like corresponding to the synchronous media files. According to various embodiments of the present disclosure, a selected media stream 240 may be displayed. For example, the selected media stream 240 may allow the user to view which frames, clips, or the like have been selected to be added to the edited media file. According to various embodiments of the present disclosure, the selected media stream 240 may be displayed so as to be juxtaposed with the arrangement of frames, clips, or the like corresponding to the synchronous media files. As illustrated in FIG. 2, the selected media stream 240 includes b0, b1, b2, c3, a4, a5, d6, and d7 which correspond to the frames, clips, or the like associated with selection 210.

According to various embodiments of the present disclosure, a user may generate inputs for performing other functionality. For example, the user may input gestures for performing functionality related to editing the synchronous media files. According to various embodiments of the present disclosure, the user may input a gesture for performing an advanced editing function. The gesture for performing an advanced editing function may be entered for a specific frame, clip, or the like. For example, a frame, clip, or the like for which the user desires to perform an advanced editing function may be selected and the user may then input a gesture corresponding to the desired advanced function. As another example, the use may input a gesture corresponding to the desired advanced function on the desired frame, clip, or the like.

According to various embodiments of the present disclosure, the input for editing the synchronous media file (e.g., or a specific frame, clip, or the like) may be input after the frames, clips, or the like constituting the edited media stream have been selected. For example, if the frames, clips, or the like that are included in the edited media stream have been selected, the user may thereafter perform advanced editing on the edited media stream or a specific frame, clip, or the like. As an example, if the user wants to perform an advanced editing function on b2 after the frames, clips, or the like that are included in the edited media stream 240 have been selected, the user may navigate to b2 displayed in the edited media stream 240 and enter a gesture corresponding to the desired advanced functionality.

According to various embodiments of the present disclosure, the input for editing the synchronous media file (e.g., or a specific frame, clip, or the like) may be input as the user selects the frames, clips, or the like to be added to the edited media stream.

According to various embodiments of the present disclosure, the advanced editing functionality may correspond to adding a special effect, changing the time duration of the clips on the timeline, increase the display of the frames, clips, or the like displayed on the user interface, changing the playback speed of the clips in the edited media file, scrolling through the timeline, zooming into or out of the frame, clip, or the like.

According to various embodiments of the present disclosure, the user may scroll through the timeline without modifying selection of the frames, clips, or the like. For example, as illustrated in FIG. 2, although selection 210 has been entered so that b0, b1, b2, c3, a4, a5, d6, and d7 are selected, the user may scroll across the timeline so as to move the selection window 230 to display time durations t1, t2, and t3.

Figure 3A:
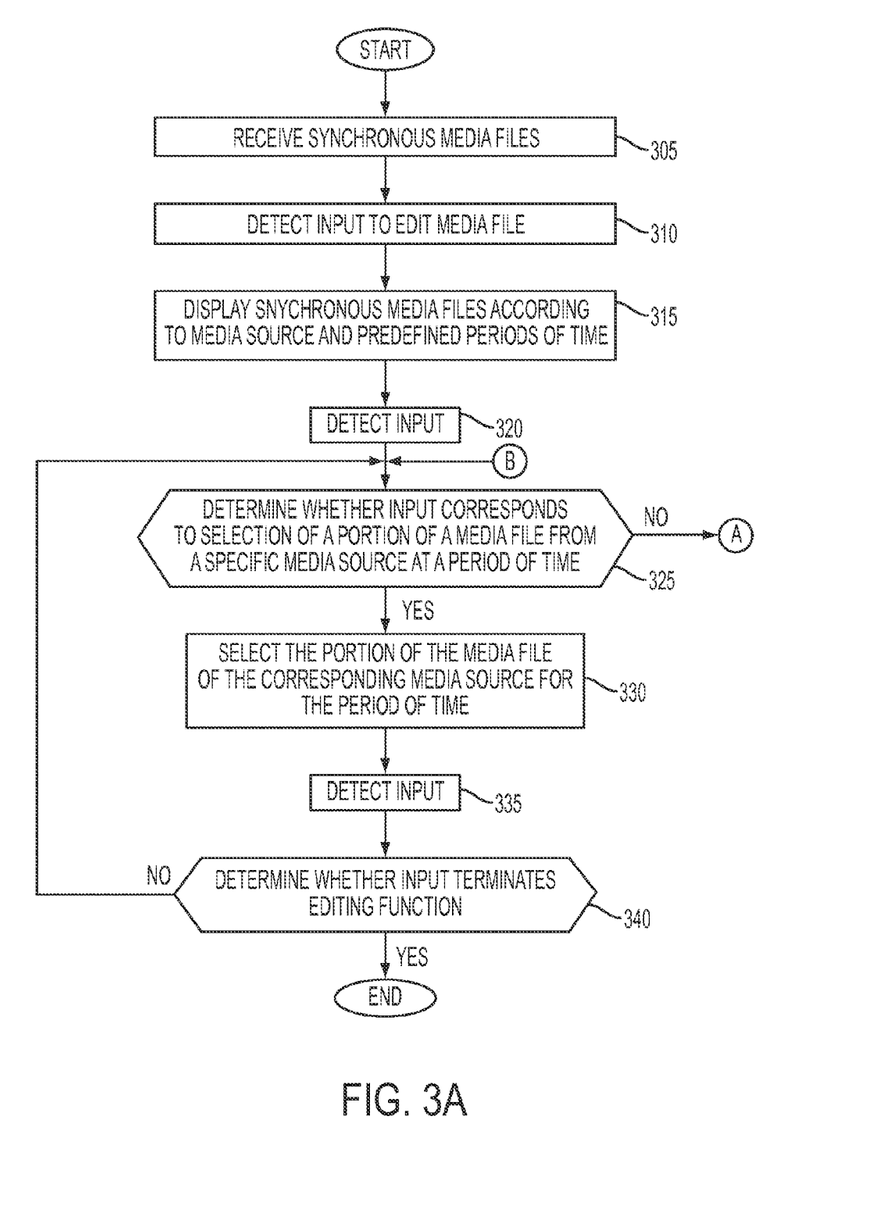
FIGS. 3A and 3B are flowcharts illustrating a method of editing synchronous media according to various embodiments of the present disclosure.
Figure 3B:
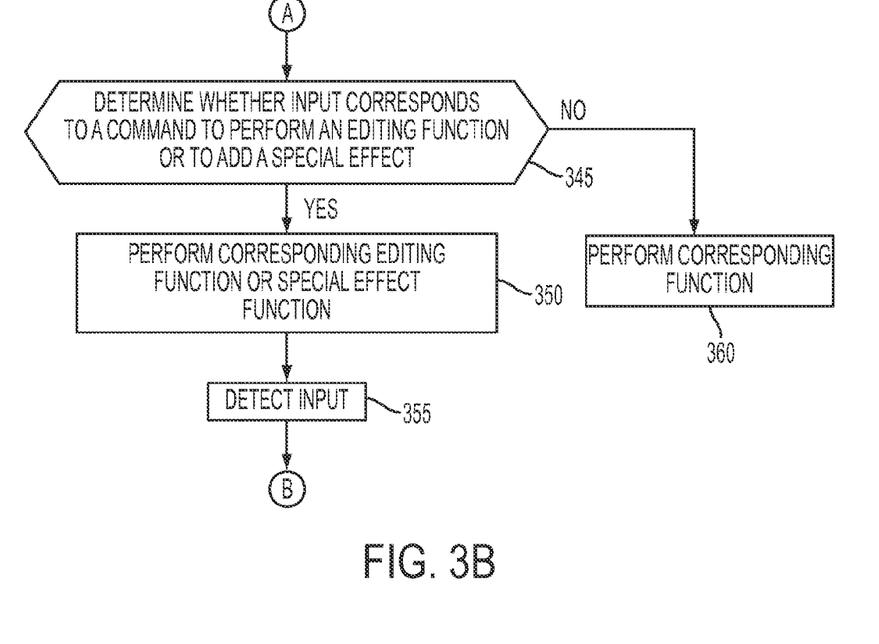

FIGS. 3A and 3B are flowcharts illustrating a method of editing synchronous media according to various embodiments of the present disclosure.

Referring to FIGS. 3A and 3B, at operation 305, a portable terminal receives synchronous media files. For example, the portable terminal may receive synchronous media files from other terminals that recorded a media file of the synchronous media file (e.g., associated with a same event). As another example, the portable terminal may retrieve or otherwise access the synchronous media files from a server (e.g., a centrally located server to which various terminals uploaded recordings for a same event). As another example, the portable terminal may retrieve or otherwise access the synchronous media files from at least one storage device.

According to various embodiments of the present disclosure, the portable terminal may pair or otherwise communicate with proximal terminals to receive the synchronous media files.

At operation 310, the portable terminal detects an input to edit the media file. For example, the portable terminal detects an input for generating an edited media file. According to various embodiments of the present disclosure, the input for generating an edited media file may further comprise a selection of synchronous media files from which the user desires to select frames, clips, or the like to generate the edited media file.

At operation 315, the portable terminal displays the synchronous media files according to media source and according to predefined periods of time. For example, the portable terminal may display synchronous media files so as to be arranged according to media stream and time durations.

At operation 320, the portable terminal detects an input.

At operation 325, the portable terminal determines whether the input corresponds to a selection of a portion of a media file from a specific media source at a period of time. For example, the portable terminal determines whether the input corresponds to a selection of a frame, clip, or the like of the synchronous media files.

If the portable terminal determines that the input corresponds to a selection of a portion of a media file from a specific media source 325, then the portable terminal proceeds to operation 330 at which the portable terminal selects the portion of the media file from the specific media source at a period of time. For example, the portable terminal selects the frame, clip, or the like of a corresponding media stream at a corresponding time duration according to the input.

Thereafter, at operation 335, the portable terminal detects an input.

At operation 340, the portable terminal determines whether the input corresponds to an input for terminating the editing function.

If the portable terminal determines that the input corresponds to an input for terminating the editing function at operation 340, then the portable terminal may terminate the editing function. According to various embodiments of the present disclosure, the portable terminal may generate an edited media file that includes frames, clips, or the like that were selected from among the synchronous media files.

In contrast, if the portable terminal determines that the input does not correspond to an input for terminating the editing function at operation 340, then the portable terminal may proceed to operation 325. For example, if the input corresponds to a selection of another frame, clip, or the like, then the portable terminal may proceed to operation 325. As another example, if the input corresponds to an input for performing an advanced editing function, the portable terminal may proceed to operation 325.

If the portable terminal determines that the input does not correspond to a selection of a portion of a media file from a specific media source 325, then the portable terminal proceeds to operation 345 at which the portable terminal determines whether the input corresponds to a command to perform an editing function or to add a special effect.

If the portable terminal determines that the input corresponds to a command to perform an editing function or to add a special effect at operation 345, then the portable terminal may proceed to operation 350 at which the portable terminal performs the corresponding editing function or special effect function. For example, if the input corresponds to an advanced editing function, then the portable terminal may perform the corresponding function.

At operation 355, the portable terminal detects an input, and thereafter proceeds to operation 325.

In contrast, if the portable terminal determines that the input does not correspond to a command to perform an editing function or to add a special effect at operation 345, then the portable terminal may proceed to operation 360 at which the portable terminal performs a corresponding function.

Figure 4:
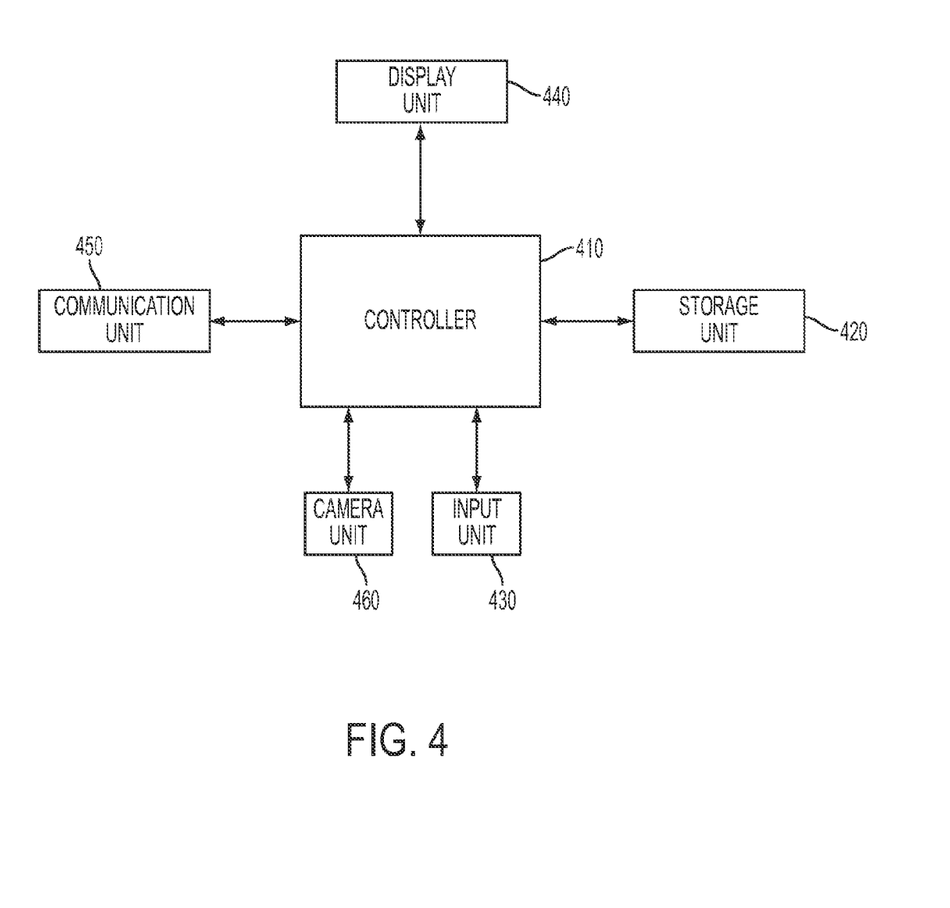
FIG. 4 is a block diagram of a terminal according to various embodiments of the present disclosure.

FIG. 4 is a block diagram of a terminal according to various embodiments of the present disclosure.

Referring to FIG. 4, a portable terminal may include a controller 410, a storage unit 420, an input unit 430, a display unit 440, and a communication unit 450. According to various embodiments of the present disclosure, the portable terminal may also include a camera unit 460. The portable terminal may also include an audio processing unit (not shown) that may generate sound, may record sound (e.g., in association with a video recorded by the camera unit 460), and/or the like. The audio processing unit may include a speaker, a microphone, and/or the like.

According to various embodiments of the present disclosure, the portable terminal comprises at least one controller 410. The at least one controller 410 may be configured to operatively control the portable terminal. For example, the at least one controller 410 may control operation of the various components or units included in the portable terminal. The at least one controller 410 may transmit a signal to the various components included in the portable terminal and control a signal flow between internal blocks of the portable terminal. In particular, according to various embodiments of the present disclosure, the at least one controller 410 may perform an action (e.g., a command, function, or the like) according to an input. For example, the at least one controller 410 may communicate with a terminal (e.g., through direct communication, or across a network). The at least one controller 410 may operatively receive synchronous media files. The at least one controller 410 may operatively display a plurality of the synchronous media streams corresponding to the synchronous media files. The at least one controller 410 may operatively display the plurality of the synchronous media streams so as to display a frame, clip, or the like that is representative of the respective synchronous media stream for a corresponding time duration. The at least one controller 410 may operatively detect an input for editing the plurality of synchronous media files. The at least one controller 410 may operatively detect an input for editing the plurality of synchronous media files so as to generate an edited media file. According to various embodiments of the present disclosure, the at least one controller 410 may detect an input for selecting a frame, clip, or the like of a synchronous media file for a specific time duration; the at least one controller 410 may associate the selected frame, clip, or the like with an edited media stream for an edited media file. The at least one controller 410 may detect an input for performing an advanced editing function. For example, the at least one controller 410 may detect an input for performing an advanced editing function for a selected frame, clip, or the like of the edited media stream. As another example, the at least one controller 410 may detect an input for performing an advanced function on at least one of the plurality of synchronous media streams, or an arrangement thereof. The at least one controller 410 may detect an input for unselecting a frame, clip, or the like that was selected to be added to an edited media stream. The at least one controller 410 may generate an edited media file corresponding to the edited media stream that includes the selected frames, clips, or the like from among the plurality of synchronous media streams for a plurality of time durations.

The storage unit 420 can store user data, and the like, as well a program which performs operating functions according to an various embodiments of the present disclosure. For example, the storage unit 420 may store a program for controlling general operation of a portable terminal, an Operating System (OS) which boots the portable terminal, and application program for performing other optional functions such as a camera function, a sound replay function, an image or video replay function, a communication function (e.g., a Near Field Communication (NFC)) function, and the like. Further, the storage unit 420 may store user data generated according to a user of the mobile terminal, such as, for example, a text message, a game file, a music file, a movie file, and the like. According to various embodiments of the present disclosure, the storage unit 420 may store an application that enables a user to edit synchronous media files. For example, the storage unit 420 may store an application that enables a user to edit synchronous media files to generate an edited media file corresponding to an edited media stream. The storage unit 420 may store an application that enables a user to select frames, clips, or the like from a plurality of synchronous media streams to generate the edited media stream. The storage unit 420 may store an application that operatively receives a plurality of synchronous media files from at least one other terminal, a server, a storage device, or the like. The storage unit 420 may store an application that enables a user to perform advanced editing functions on a synchronous media stream, the edited media stream, an arrangement of the synchronous media stream or edited media stream, or the like. The storage unit 420 may store an application that enables a user to perform advanced editing functions on a frame, clip, or the like for a synchronous media stream or the edited media stream.

The input unit 430 may include input keys and function keys for receiving user input. For example, the input unit 430 may include input keys and function keys for receiving an input of numbers or various sets of letter information, setting various functions, and controlling functions of the portable terminal. For example, the input unit 430 may include a calling key for requesting a voice call, a video call request key for requesting a video call, a termination key for requesting termination of a voice call or a video call, a volume key for adjusting output volume of an audio signal, a direction key, and the like. In particular, according to various embodiments of the present disclosure, the input unit 430 may transmit to the controller 410 signals related to selection and/or editing of a frame, clip, or the like. The input unit 430 may transmit to the controller 410 signals related to an arrangement of a synchronous media stream, an edited media stream, a frame, clip, or the like for a synchronous media stream or edited media stream, and/or the like. Such an input unit 430 may be formed by one or a combination of input means such as a touch pad, a touchscreen, a button-type key pad, a joystick, a wheel key, and the like.

The display unit 440 displays information inputted by user or information to be provided to user as well as various menus of the portable terminal. For example, the display unit 440 may provide various screens according to a user of the portable terminal, such as an idle screen, a message writing screen, a calling screen, and the like. In particular, according to various embodiments of the present disclosure, the display unit 440 may display a menu and a screen for receiving synchronous media files. The menu may include a list of functions relating to the transfer of data across devices. For example, the menu may include a list including a function corresponding to copying data to a device, pasting data from a device, and the like. The menu may be displayed to enable a user to select data to be transferred and/or to select a device from which the data may be transferred. According to various embodiments of the present disclosure, the display unit 440 may display an interface which the user may manipulate or otherwise enter inputs via a touchscreen to operatively receive a plurality of synchronous media files. According to various embodiments of the present disclosure, the display unit 440 may display an interface which the user may manipulate or otherwise enter inputs via a touchscreen to enter selection of the frames, clips, or the like that form the edited media stream. According to various embodiments of the present disclosure, the display unit 440 may display an interface which the user may manipulate or otherwise enter inputs via a touchscreen to perform advanced editing of media files and/or media streams associated therewith (e.g., synchronous media streams, the edited media stream, frames, clips or the like of the synchronous media stream, the edited media stream, or the like). The display unit 440 can be formed as a Liquid Crystal Display (LCD), an Organic Light Emitting Diode (OLED), an Active Matrix Organic Light Emitting Diode (AMOLED), and the like. However, various embodiments of the present disclosure are not limited to these examples. Further, the display unit 440 can perform the function of the input unit 430 if the display unit 440 is formed as a touchscreen.

The communication unit 450 may be configured for communicating with other devices. For example, the communication unit 450 may be configured to communicate via Bluetooth technology, WiFi technology, NFC technology, infrared technology, or another wireless technology. According to various embodiments of the present disclosure, the portable terminal may be paired with another terminal (e.g., using NFC or the like), and the portable terminal may transfer data to and/or receive data from another terminal via the communication unit 450. According to various embodiments of the present disclosure, the portable terminal may receive synchronous media files from at least one other terminal, may access and/or retrieve synchronous media files from a server, and/or the like.

According to various embodiments of the present disclosure, the camera unit 460 may capture an image, video, and/or the like. The camera unit 460 may operatively store the image, video, and/or the like on the storage unit 420.

According to various embodiments of the present disclosure, the camera unit 460 may include a flash, a filter, a unit for zooming, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for editing synchronous media files, the method comprising:
    receiving a plurality of synchronous media files;
    displaying a plurality of synchronous media streams corresponding to the synchronous media files on a screen;
    detecting a touch input;
    selecting a portion of one of the plurality of synchronous streams corresponding to a position where the touch input was initially detected;
    in response to detecting the touch input, automatically scrolling the plurality of synchronous media streams while the touch input is maintained; and
    continuously adding selected portions corresponding to positions of the touch input of the plurality of synchronous media streams to an edited media stream while the touch input is maintained.

2. The method of claim 1, wherein the displaying of the plurality of synchronous media streams comprises:
    arranging a representative portion of each of the plurality of media streams for a plurality of time durations on the screen.

3. The method of claim 2, wherein the arranging of the representative portion of each of the plurality of media streams for the plurality of time durations on the screen comprises:
    arranging the representative portions into an array,
        wherein along one axis of the array, a timeline is represented according to preset time durations, and wherein along another axis of the array, the corresponding plurality of synchronous media streams are represented for a corresponding time duration.

4. The method of claim 3, wherein the detecting of the touch input for selecting the portion of one of the plurality of synchronous streams comprises:
   detecting the touch input on a first one of the representative portions; and
   selecting the first representative portion on which the touch input is received.

5. The method of claim 4, wherein the detecting of the touch input for selecting the portion of one of the plurality of synchronous streams further comprises:
   detecting that the touch input is dragged;
   determining whether the dragged touch input is dragged over a second one of the representative portions; and
   selecting the second representative portion over which touch input is dragged.

6. The method of claim 5, wherein the automatically scrolling the plurality of synchronous media streams further comprises:
   scrolling an arrangement of the representative portions along the timeline when the drag of the touch input is detected.

7. The method of claim 5, wherein the detecting of the touch input for selecting the portion of one of the plurality of synchronous streams further comprises:
   sequentially selecting corresponding representative portions as the touch input is dragged over such representative portions.

8. The method of claim 7, wherein the detecting of the touch input for selecting the portion of one of the plurality of synchronous streams further comprises:
   scrolling an arrangement of the representative portions along the timeline as corresponding representative portions are sequentially selected.

9. The method of claim 7, wherein the detecting of the touch input for selecting the portion of one of the plurality of synchronous streams further comprises:
   unselecting a corresponding representative portion as the touch input is dragged in a direction opposite to a direction in which selection of the representative portion is made.

10. The method of claim 7, wherein each of the representative portions corresponds to at least one of a frame, a clip, an indicia corresponding to a portion of an applicable one of the synchronous media streams.

11. The method of claim 1, further comprising:
    detecting a gesture for performing an advanced editing function; and
    performing the advanced editing function associated with the detected gesture.

12. The method of claim 11, wherein the performing of the advanced editing function associated with the detected gesture comprises:
    performing the advanced editing function on a portion of the synchronous media stream corresponding to the representative portion for which the gesture is detected.

13. The method of claim 1, further comprising:
    displaying the edited media stream.

14. The method of claim 1, further comprising:
    detecting a gesture for performing an advanced editing function on the edited media stream; and
    performing the advanced editing function on a portion of the edited media stream corresponding to the representative portion for which the gesture is detected.

15. A non-transitory computer-readable storage medium storing instructions that, when executed, cause at least one processor to perform the method of claim 1.

16. An apparatus for editing synchronous media files, the apparatus comprising:
    a communication unit configured to receive a plurality of synchronous media files;
    a touchscreen configured to display a plurality of synchronous media streams corresponding to the synchronous media files; and
    a controller configured to:
       receive a plurality of synchronous media files through the communication unit,
       display a plurality of synchronous media streams corresponding to the synchronous media files on the touchscreen,
       detect a touch input,
       select a portion of one of the plurality of synchronous streams corresponding to a position where the touch input was initially detected,
       in response to detecting the touch input, automatically scroll the plurality of synchronous media streams while the touch input is maintained, and
       continuously add selected portions corresponding to positions of the touch input of the plurality of synchronous media streams to an edited media stream while the touch input is maintained.

17. The apparatus of claim 16, wherein the controller is further configured to operatively arrange a representative portion of each of the plurality of media streams for a plurality of time durations on the touchscreen.

18. The apparatus of claim 17, wherein the controller is further configured to operatively arrange the representative portions into an array,
    wherein along one axis of the array, a timeline is represented according to preset time durations, and
    wherein along another axis of the array, the corresponding plurality of synchronous media streams are represented for a corresponding time duration.

19. The apparatus of claim 18, wherein the controller is further configured to:
    operatively detect the touch input on a first one of the representative portions, and
    operatively select the first representative portion on which the touch input is received.

20. The apparatus of claim 19, wherein the controller is further configured to:
    operatively detect that the touch input is dragged,
    operatively determine whether the dragged touch input is dragged over a second one of the representative portions, and
    operatively select the second representative portion over which touch input is dragged.

21. The apparatus of claim 20, wherein the controller is further configured to operatively scroll an arrangement of the representative portions along the timeline when the drag of the touch input is detected.

22. The apparatus of claim 20, wherein the controller is further configured to operatively sequentially select corresponding representative portions as the touch input is dragged over such representative portions.

23. The apparatus of claim 22, wherein the controller is further configured to operatively scroll an arrangement of the representative portions along the timeline as corresponding representative portions are sequentially selected.

24. The apparatus of claim 22, wherein the controller is further configured to operatively unselect a corresponding representative portion as the touch input is dragged in a direction opposite to a direction in which selection of the representative portion is made.

25. The apparatus of claim 22, wherein each of the representative portions corresponds to at least one of a frame, a clip, an indicia corresponding to a portion of an applicable one of the synchronous media streams.

26. The apparatus of claim 16, wherein the controller is further configured to:
   operatively detect a gesture for performing an advanced editing function, and
   operatively perform the advanced editing function associated with the detected gesture.

27. The apparatus of claim 26, wherein the controller is further configured to operatively perform the advanced editing function on a portion of the synchronous media stream corresponding to the representative portion for which the gesture is detected.

28. The apparatus of claim 16, wherein the controller is further configured to operatively display the edited media stream.

29. The apparatus of claim 16, wherein the controller is further configured to:
   operatively detect a gesture for performing an advanced editing function on the edited media stream, and
   operatively perform the advanced editing function on a portion of the edited media stream corresponding to the representative portion for which the gesture is detected.

* * * * *